United States Patent
Thibon et al.

(10) Patent No.: US 6,424,700 B1
(45) Date of Patent: Jul. 23, 2002

(54) NETWORK BASED DISTRIBUTED PBX WITH CONNECTION LOSS SURVIVAL FEATURES

(75) Inventors: Michel Thibon, Savigny sur Orge; Sandrine Millet; Erlé De Pillot, both of Paris, all of (FR); Ian D. Sinclair; Cuthbert C. Cheung, both of Belleville (CA); Aline Gateau, Vincennes (FR)

(73) Assignee: Nortel Networks Corporation, Montreal (CA)

( * ) Notice: Subject to any disclaimer, the term of this patent is extended or adjusted under 35 U.S.C. 154(b) by 0 days.

(21) Appl. No.: 09/458,197

(22) Filed: Dec. 9, 1999

(51) Int. Cl.[7] .......................... H04M 1/24; H04M 3/08; H04M 3/22; H04M 3/00
(52) U.S. Cl. ................................ 379/32.04; 379/15.02; 379/1.01; 379/198
(58) Field of Search .............................. 379/1, 34, 164, 379/165, 196, 198, 207, 229, 231, 234, 268, 272, 279, 1.01, 9, 14, 15.01, 32.04, 156

(56) References Cited

U.S. PATENT DOCUMENTS 5,661,719 A * 8/1997 Townsend et al. .......... 370/216
5,875,234 A * 2/1999 Clayton et al. ........... 379/93.05
6,005,920 A * 12/1999 Fuller et al. .................... 379/1
6,240,533 B1 * 5/2001 Stemmer ...................... 714/48

FOREIGN PATENT DOCUMENTS

JP          9-294138     * 11/1997   ............ H04L/12/46

* cited by examiner

*Primary Examiner*—Binh Tieu
(74) *Attorney, Agent, or Firm*—Lee, Mann, Smith, McWilliams, Sweeney & Ohlson

(57) ABSTRACT

Methods and apparatus are described for maintaining established local calls at an access module in case of change of the call control for a distributed PBX over a communications network, e.g. WAN or LAN, especially an IP network. In accordance with a first main embodiment, the system is composed of one Call Server controlling the call processing of other PBX access modules in a normal situation. These access modules have the ability to operate in Stand Alone or Survival mode if the link to the Call Server is down for any reason. In a second main embodiment, two call servers may be used, an active call server and a hot-standby server. The active call server controls the call processing of the access modules. In case the link between one access module and the active call server fails, the hot-standby Call Server can take over the control of the access module. Therefore, each module can operate in normal mode of the active call server 1 or in normal mode of the hot-standby call server or, as an alternative to either of these, in stand alone or survival mode.

38 Claims, 11 Drawing Sheets

US 6,424,700 B1

NETWORK BASED DISTRIBUTED PBX WITH CONNECTION LOSS SURVIVAL FEATURES

The present invention relates to network based telephone systems and in particular to systems and methods of integrating a private branch exchange (PBX) into a shared resource network.

TECHNICAL BACKGROUND

A network based PBX system is known from U.S. Pat. No. 5,875,234 which describes a computer integrated telephony system (CIT) that integrates a PBX with a Local Area Network (LAN). The PBX is connected to a server on a LAN. The PBX performs telecommunications functions which include establishing circuit connections between calls from a public telephone system and the individual extension lines of an office. If the connection to the server fails, the computer based PBX is able to maintain power. The known system uses a network element configured as a PBX. All call processing is carried out by the PBX, the server playing a non-existent or only a very minor role in the establishment of calls. An extension interface is provided on each PBX unit for addition of more PBX units to increase capacity. When this is done, one of the PBX's is the master PBX and all others are in the normal mode. This known system does not exploit to the full the possibilities of distributed call processing and PBX facilities in a network. It does not provide a distributed PBX system integrated into a shared resource network such as a LAN.

It is an object of the present invention to provide a network based distributed PBX function and a method of operating the same which maintains calls during failure of the network or failure of the network's server.

SUMMARY OF THE INVENTION

The present invention may provide a telecommunications system comprising: a shared resources network; an access module connected to the shared resources network for allowing telephone access to the telecommunications system; at least two user terminals connected to the access module; a call server on the shared resources network for controlling call signaling for each telephone call handled by the access module; wherein the access module is adapted to maintain a call between the two user terminals on the access module if connection to the call server is below a pre-determined quality of service. The access module is also preferably adapted to transfer the call signaling control back to the call server once the connection to the server is restored. On this switch back, all existing calls are maintained on the access module. Preferably, the access module has a means for continuously monitoring the quality of service of the connection to the call server. The monitor is used to decide whether the connection to the call server has been lost or restored and to take the necessary steps to switch to survival mode or to switch back to normal mode operation.

The present invention may also provide method of operating a telecommunications system having a shared resources network, an access module connected to the shared resources network for allowing telephone access to the telecommunications system; at least two user terminals connected to the access module; and a call server on the shared resources; the method comprising the steps of: using the call server to control call signaling for each telephone call handled by the access module in a first mode, establishing a call between the two user terminals connected to the access module; and when the connection between the access module and the call server drops below a pre-determined quality of service: maintaining the call between the two user terminals connected to the access module; and transferring control of call signaling to the access module from the call server for the call between the two user terminals.

The present invention may also provide a telecommunications system comprising: a shared resources network; a plurality of network elements connected to the shared resources network, the network elements comprising at least an access module for allowing telephone access to the telecommunications system and a call server for controlling call signaling for each telephone call handled by the access module; at least two user terminals connected to the access module; wherein the access module is configured to maintain a call between the two user terminals on the access module when call signaling control is transferred from the call server to another network element. The another network element may be another call server or the access module itself The present invention may also provide method of operating a telecommunications system with a shared resources network and a plurality of network elements connected to the shared resources network, the network elements comprising at least an access module for allowing telephone access to the telecommunications system and a call server for controlling call signaling for each telephone call handled by the access module; establishing a call between at least two user terminals connected to the access module; maintaining the call between the two user terminals on the access module when call signaling control is transferred from the call server to another network element.

The present invention may provide a telecommunications system comprising: a shared resources network; an access module connected to the shared resources network for allowing telephone access to the telecommunications system; at least two user terminals connected to the access module; a call server on the shared resources network; wherein the access module is adapted to set up and maintain a call between the two user terminals on the access module if the connection to the call server is below a predetermined quality of service and for transferring call signaling control for each telephone call handled by the access module to the call server if connection to the call server is above a pre-determined quality of service.

The present invention may also provide a method of operating a telecommunications system having a shared resources network, an access module connected to the shared resources network for allowing telephone access to the telecommunications system; at least two user terminals connected to the access module; and a call server on the shared resources; the method comprising the steps of: using the access module to control call signaling for each telephone call handled by the access module in a first mode; establishing a call between the two user terminals connected to the access module; and when the connection between the access module and the call server rises above a pre-determined quality of service: maintaining the call between the two user terminals connected to the access module; and transferring control of call signaling to the call server from the access module for the call between the two user terminals.

The present invention may also provide an access module for a telecommunications system having a shared resources network and a call server in which the call server handles all call signaling; the module comprising: a monitoring unit for monitoring a quality of service parameter of a connection between the access module and the call server on the shared resources network, a management unit for deciding when the quality of service of the connection drops below a pre-determined level; and a switch over unit adapted for switching over the control of call signaling to the access module when the management unit decides that the connection with the call server is below the pre-determined quality of service.

Finally, the present invention may also provide an access module for a telecommunications system having a shared resources network and a call server as a network element; the module comprising: a monitoring unit for monitoring a quality of service parameter of a connection between the access module and the call server on the shared resources network, a management unit for deciding when the quality of service of the connection rises above a pre-determined level; and a switch over unit adapted for switching over the control of call signaling to the call server when the management unit decides that the connection with the call server is above the predetermined quality of service.

The present invention includes methods and apparatus for maintaining established local calls at an access module in case of change of the call control for a distributed PBX over a communications network, e.g. WAN or LAN, especially an IP network. This will be described for two different embodiments of the present invention. In accordance with the first main embodiment, the system is composed of one Call Server controlling the call processing of other PBX access modules in a normal situation. The access modules will be described as operating in Normal mode in this case. These access modules have the ability to operate in Stand Alone or Survival mode if the link (connection) to Call Server is down for any reason. In the second main embodiment, two call servers may be used, an active call server and a hot-standby server. The active call server controls the call processing of the access modules. In case the link (connection) between one access module and the active call server fails, the hot-standby Call Server can take over the control of the access module. Therefore, each module can operate in normal mode of the active call server 1 or in normal mode of the hot-standby call server or, as an alternative to either of these, in stand alone or survival mode.

The dependent claims define separate, individual embodiments of the present invention. The present invention will now be described with reference to the following drawings.

BRIEF DESCRIPTIONS OF THE DRAWINGS

DEFINITIONS

Figure 1:
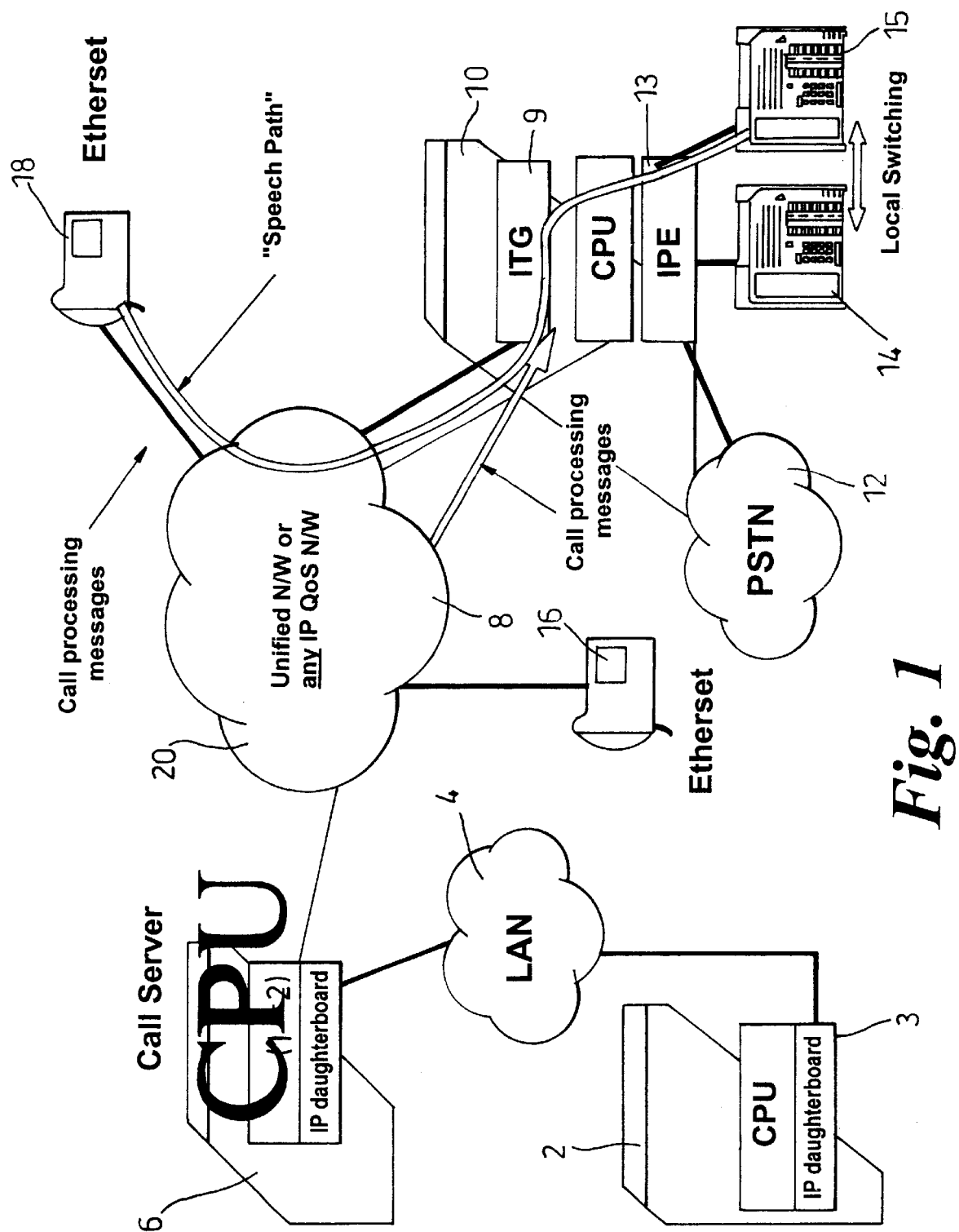
FIG. 1 is a schematic representation of a telecommunications network with which the present invention may be used.

System: The system contains one active Call Server and potentially a second Call Server on hot standby, both linked via network to all access modules (distributed PBX over a network).

Call Server: When active, this server controls the call processing done on itself and on all linked access modules which are in normal mode. For all call processing handled by the Call Server, including peer to peer calls, images of all physical connections are stored in a Network Memory places on the Call Server. The hot-standby Call Server does not control any call processing while in standby mode but is able to take over the control of any access module whose link to the active Call Server is down.

Access Module: It can operate in two modes: in Normal and in Survival mode. In normal mode, which is the more frequently used mode generally, an access module does not handle any call processing. It receives requests for physical connections via messages sent through the network link by the Call Server. These connections are stored on the access module in a network memory.

Peer-to-peer call: a call between a party on one access module and a party on another one (a party can be a set or a trunk). Local call: a call between two parties on the same access module.

Call signaling: set of exchanged messages used for call set-up and optionally release. Generally does not contain traffic messages.

Network Memory: memory where all physical connections are stored. The Network Memory is present on the or each call server as on all access modules. It is updated call-by-call on the call server (for each call handled by it) and on the access module (in Normal mode as in Survival mode) as soon as a connection is done. The Network Memory on the call server contains a virtual image of all physical connections done on all access modules which are connected with it in normal mode. The Network Memory on an access module in normal mode or in survival mode contains all local physical connections done on itself The network memory is used to rebuild local established calls.

Link Down: The connection between a call server and an access module is checked permanently. This process allows a call Server and all access modules to detect any problem and to declare the link is down if:
 Call Server is out of order,
 LAN or WAN are severely degraded.
The link down detection is the trigger for the switch over of each access module to survival mode.

Active link: means that this link is used to connect a module in normal mode with its call server (which handles its own call processing).

Link Up: this means that the link is available and offers an acceptable quality of service.

Switch Over: A switch over handles the change of operating mode on an access module from the normal mode to the survival mode. This change makes a module, which was in normal mode and under the control of the call server, able to handle its own call processing in survival mode. The same database as Call Server's one is loaded on this access module during this switch over. It is important to note that the Network Memory is not cleared during a switch over. It is an important parameter to make an access module able to rebuild all its local calls. All established local calls are maintained during this phase of change: the channel of voice is available during the switch over process and after it. A switch over is triggered by the detection of the link down between the Call Server and an access module.

Switch Back: A switch Back is done to return in the normal mode when problems on the network or other kinds of problem are resolved (the connection is again available). A switch back handles the change of operating mode from survival to normal mode for each access module in survival mode. The Network Memory is not cleared during this change.

DESCRIPTION OF THE ILLUSTRATIVE EMBODIMENTS

The present invention will be described with reference to certain embodiments and with reference to certain drawings but the present invention is not limited thereto but only by the claims. In particular the present invention will mainly be described with reference to cable-, wire-, or optical fiber connected Local Are Networks (LAN) and Wide Area Networks (WAN) but the present invention is not limited thereto. The shared resource area network in accordance with the present invention may include any suitable network such as a LAN, a WAN whether these are wired, cabled or a wireless LAN or WAN. One aspect of the present invention is to use a Shared Resources Network (SRN). In an SRN hardware resources are shared. An SRN in accordance with the present invention is more-or-less synonymous with a LAN or WAN, but the term SRN is used to indicate that the present invention is not limited to specific aspects of known LAN's e.g. contention method or whether Ethernet, Token Ring or Wireless LAN. Also the topology of the LAN or WAN is not considered a limit on the present invention, e.g. bus physical, star physical, distributed star, ring physical, bus logical, ring logical may all be used as appropriate. Various standards have been produced for LAN's, e.g. IEEE 802.3, IEEE 802.4, IEEE 802.5, ANSI X3T9.5 (FDDI, I and II) any of which may find advantageous use with the present invention. LAN and WAN design and construction are discussed in detail in, for example, "Mastering Local Area Networks", by Christa Anderson and Mark Minasi, SYBEX Network Press, 1999 or "Data Communications, Computer networks and Open Systems", by Fred Halsall, Addison-Wiley, 1996. Various types of wireless LAN have been standardized or are in general use, e.g. the standards IEEE 802.11, IEEE 802.11HR (Spread Spectrum)and systems based on DECT, Blue Tooth, HIPERLAN, Diffuse or point-to-point infra- red. Wireless LAN's are discussed in detail in "Wireless LAN's" by Jim Geier, Macmillan Technical Publishing, 1999.

FIG. 1 is a schematic representation of a communications network to which the present invention may be applied. It includes at least one Shared Resources Network (SRN) such as a Local Area Network (LAN) 4 and/or a Wide Area Network (WAN) 20, at least one Access Module (AM) 2, 10 and at least one Call Server (CS) 6 which is in communication with at least one of the Access Modules 2, 10 either via the LAN 4 and/or WAN 20. In addition, there may be telephone or data terminal sets 16, 18 for direct connection to the LAN 4 or WAN 20. A Public Service Telephone Network 12 (PSTN) may be connected to a WAN AM 10 or a LAN AM 2. The PSTN 12 may also include a mobile telephone system, e.g. a public GSM system. Connected to a LAN AM 2 and/or a WAN AM 10 may be one or more telephone and/or data terminal sets 14, 15 such as telephone or fax sets. The CS 6 typically has a Central Processing Unit (CPU) for running call processing software. A second back-up CPU may be provided. The Call Server 6 may provide tones for telephonic services and call conferencing facilities for locally attached resources. An LAN AM 2 may be identical to a WAN AM 10 but it is within the scope of the present invention that a LAN AM 2 is simpler in design than a WAN AM 10. For instance, the LAN AM 2 may provide non-blocking and non-compressed voice connections but requires low latency and higher bandwidth between modules. The connection to the LAN 4 may be via a daughterboard 3 which is configured to provide the relevant network protocols, e.g. Ethernet™ or Token Ring™ protocols. Such modules may be used on a circuit switched LAN on which calls may be set up between modules on a circuit switched basis.

On the other hand a WAN AM 10 may be configured to deal with the longer delays expected on a WAN and some LAN's, e.g. it may be configured to use voice over network protocols such as those required for voice over an internet protocol (VOIP). If the WAN 20 uses the Internet Protocol then the WAN AM 10 includes a TCP/IP protocol stack. Various terms such as "Internet Telephony", "Voice Over IP" (VOIP), and "Voice and Fax over IP" (XoIP) are used in the IP Telephony industry to describe IP network based telephony services. With respect to this invention, any of these terms are meant to include voice and data services transported over managed IP networks engineered for quality IP Telephony services or via the Internet which refers to voice & data transported over an unmanaged network. The Internet is a collection of independent networks with high capacity in only some of the participating networks, has limited security, is subject to service disruptions and has no standardized means to guarantee the Quality of Service (QoS) between the networks or even within a network. Transmitting voice messages over Internet networks is described in detail in the book by Daniel Minoli and Emma Minoli, entitled "Delivering Voice over IP Networks", Wiley Computer Publishing, 1998. A WAN AM 10 may use an Internet Gateway Card (ITG) 9 to provide voice connections between modules. Calls are set up individually and voice path set up is done over the network 20. The WAN AM 10 may provide voice compression and does not require such a low latency as the LAN AM 2 described above.

The line form the PSTN 12 may be connected to the WAN AM 10 via an interface 13 to which the terminal sets 14, 15 may also be connected. For telephone calls local to an AM 2, 10 (local switching) Time Division Multiplexing (TDM) may be used in conjunction with Pulse Code Modulation (PCM). To provide this service the WAN AM 10 is provided with the necessary multiplexers and switches to multiplex several PCM digital calls between local sets. On the other hand when speech must be transmitted across an IP network, e.g. the WAN 20, a Digital Signal Processing (DSP) resource on an ITG 10 is used to provide the voice compression. Such connections may be from a WAN AM 10 to a resource on a call server 6, to an Internet telephone 16, 18 or to another AM 2. For locally connected calls, a WAN AM 10 may provide tones and local conferencing facilities to its local resources.

Figure 2:
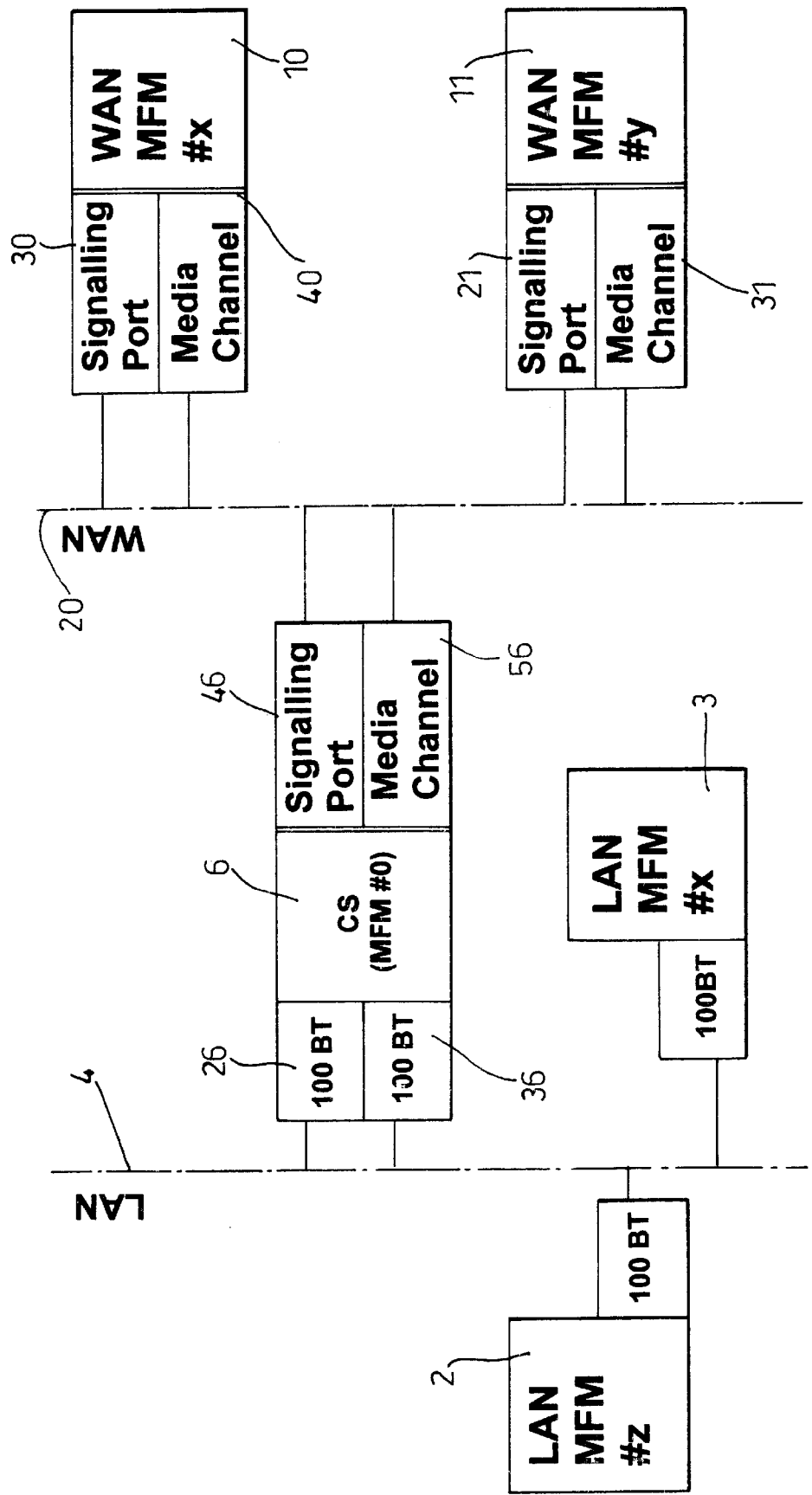
FIG. 2 is a schematic block diagram representation of the network of FIG. 1.

The complete system may be configured to allow various types of telephone or data call which will be described with reference to FIGS. 2 to 5. FIG. 2 is a schematic representation of the system connections. It includes a call server 6 connected optionally on one side to a LAN 4 via interfaces 26, 36, e.g. Ethernet™ cards, and optionally on another side to a WAN 20 via a signaling port 46 for call signaling and control messages and via a media channel 56 for transmission of traffic data, e.g. data packets or packetized voice messages. The media channels may be accessed as a shared resource, the channel and its associated DSP unit(s) being allocated on a dynamic call-by-call basis via an ITG card.

One or more LAN AM 2, 3 communicates over the LAN 4 through suitable interfaces, e.g. via an Ethernet™ card. In one embodiment of this invention, a LAN AM 2, 3 allows telephone access to terminal sets which may be either digital sets or analogue sets. Alternatively or additionally one or more WAN AM 10, 11 communicate via the WAN 20 each having a signaling port and a media channel 30, 40, 21, 32 respectively which are similar to the signaling port 46 and the media channel 56 of the call server 6. When the system is booted up each access module 2, 3, 10, 11 sends a registration message to the call server 6 and awaits a registration response from the call server 6. If the call server accepts the access module, the access module enters normal mode and downloads a data base from the call server giving configuration details for the AM. Each time the configuration is changed and saved on the call server 6, the database is downloaded to every AM 2, 3, 10, 11. If there is no response from the call server 6 the access module enters survival mode.

In the following the operation of a WAN AM will be described in accordance with an embodiment of the present invention. A WAN AM in accordance with the present invention may operate in two modes. In a first normal mode, a call server 6 controls the configuration and the call processing for each WAN AM. In a second survival mode, each WAN AM is able to operate independently. In this mode, each WAN AM may support local calls and switching without access to the call server 6 for call processing. Each WAN AM has a processor such as a microprocessor and a memory for storing application programs as well as a memory for storing data relevant to the control of calls on the module. The processor controls the operation of the access module.

Figure 3:
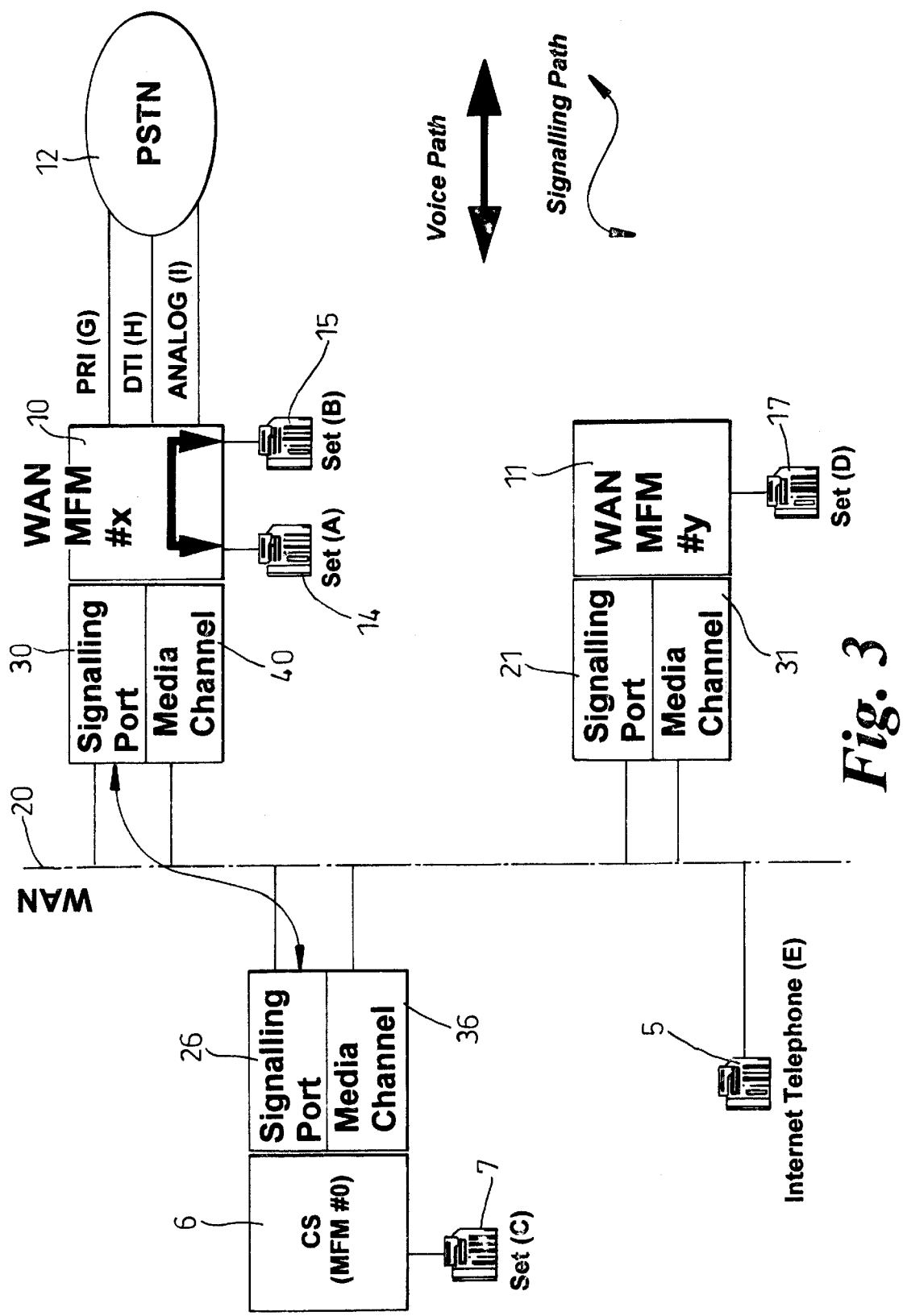
FIGS. 3–5 is a schematic block diagram representation of a part of the network of FIG. 1 showing different call connect arrangements between access modules.
Figure 4:
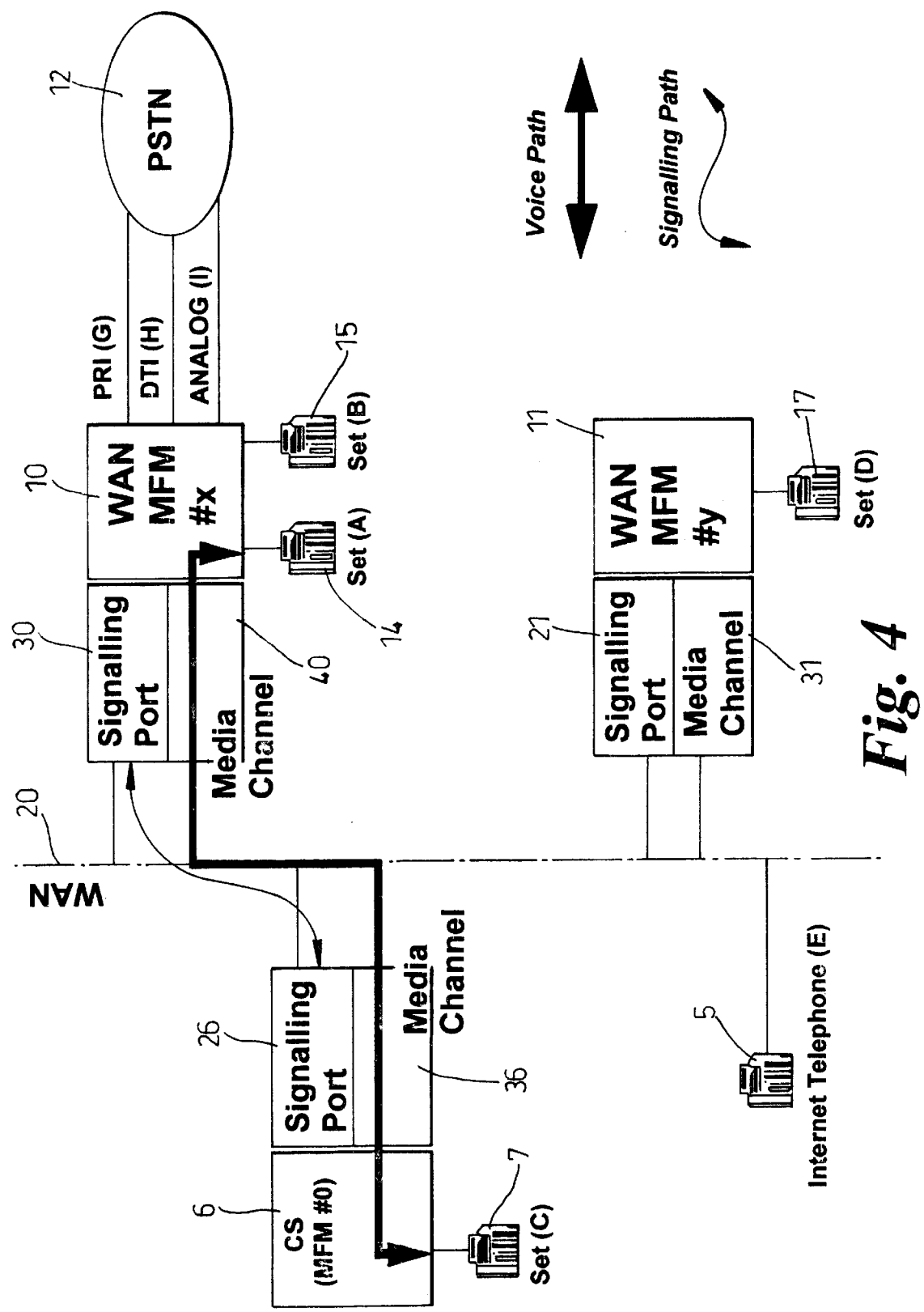
Figure 5:
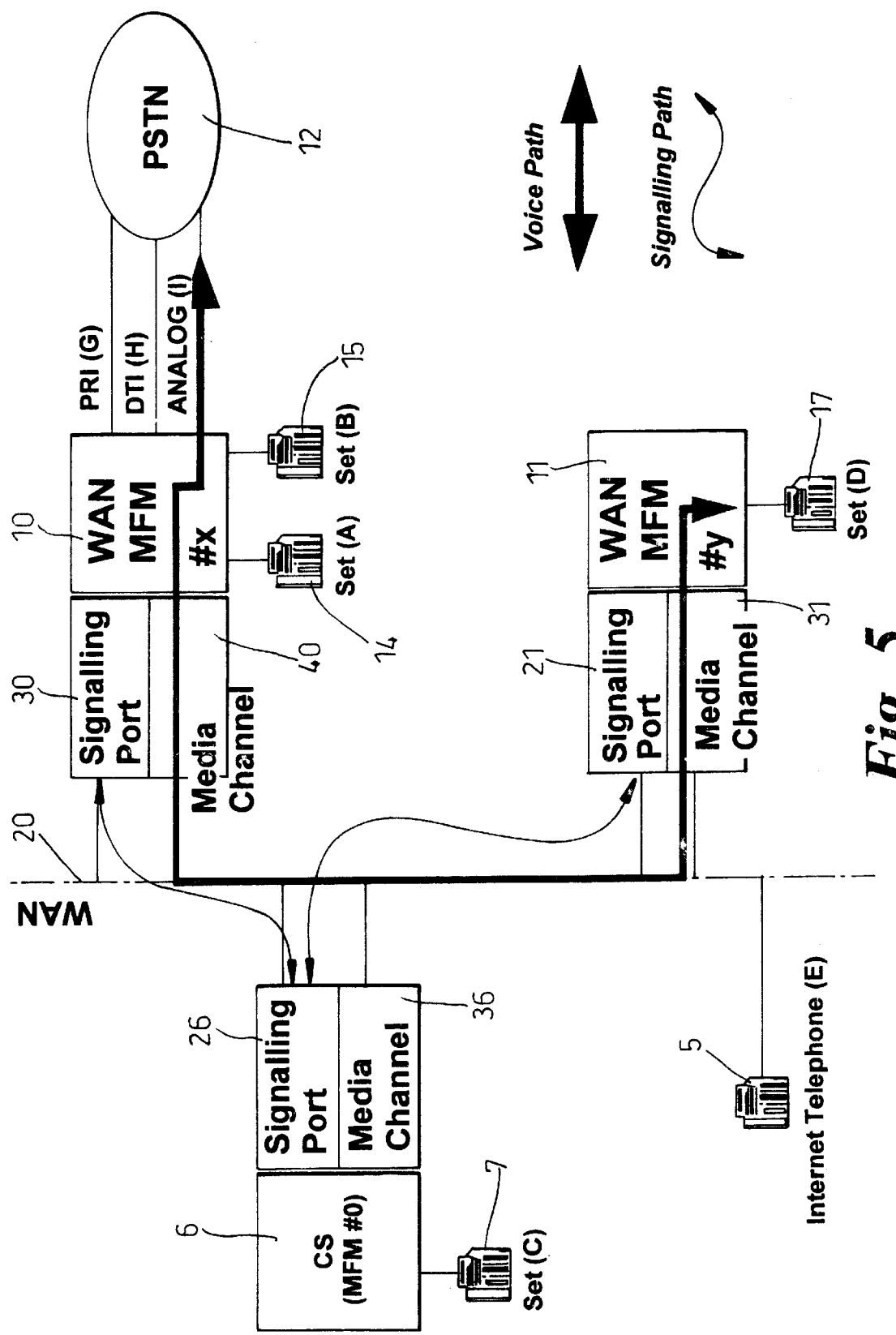

In normal mode there are typically three types of call as shown schematically in FIGS. 3 to 5. As shown in FIG. 3, a call is established between two sets 14, 15 connected to the WAN AM 10. No ITG DSP resources are used. Instead the calls are provided a time slot in a TDM system. The WAN AM 10 has the necessary multiplexers and switches and buffers (if required) to multiplex a plurality of user messages and to direct individual messages to the appropriate local set 14, 15. Messages are transmitted in a suitable digital format, e.g. PCM. The voice path is local to the WAN AM 10. The call signaling path goes through the call server 6 via the signaling ports 30 and 26 of the WAN AM 10 and the call server 6, respectively and the WAN 20.

As shown in FIG. 4, for a call between a terminal set 7 on the call server 6 and a terminal set 14 on the WAN AM 10 the call signaling goes via the signaling ports 26, 30 and WAN 20 and the voice messages go via the media channels 36, 40 and WAN 20. ITG cards on the CS 6 and the WAN 10 are allocated for the voice messages and DSP units are allocated on demand.

Finally, with respect to FIG. 5, a call may be set up between two WAN AM 10, 11. In this case the call signaling goes via the WAN 20 to the server 6 whereas the voice/data messages go between AN 10 and 11 via WAN 20. An ITG card with associated DSP unit(s) is used for the voice/data messages in both the AM 10 and 11. For example an incoming telephone call may arrive via PSTN 12 destined for the terminal set 17 on WAN AM 11. In this case an interface board on the WAN AM 10 converts the analogue signals from PSTN into digital signals the call is set up with the terminal 17 on AM 11. The user messages are compressed and encapsulated for transport on the WAN 20 by the AM 10 and are placed in the correct frame format. At WAN AM 11, the reverse procedure is carried out and a digital or analogue signal is delivered to the set 17.

As can be seen from above call signaling always goes via the CS 6. This provides a true integration of a distributed PBX function into a distributed area network. More access modules may be added to the system as required. None of the access modules are designated as a "master" access module. Instead the central signal processing unit is always the call server 6. The system is extendible to a WAN or to several linked LAN's.

This system has a disadvantage. If the WAN 20 or the server 6 goes out of operation, no calls can be set up in normal mode. In accordance with the present invention, it is preferred if each AM 10, 11 has its own power supply independent of its mode of operation so that if power fails on the server 6 there is no effect on the operation of any of the AM 10, 11. The first action taken by an AM when there is loss of connection to the server 6 is the activation of local call processing control at the AM 10, 11. Then each WAN AM 10, 11 to operates independently. However, further action is necessary to allow local calls to be set up at each WAN AM 10, 11 in case of failure of the WAN 20 and/or server 6 as well as the maintenance of any existing local calls at any WAN AM. While local calls on an AM are maintained, any inter-module calls or module-server calls are lost and the calls are terminated and billing records generated.

Figure 6:
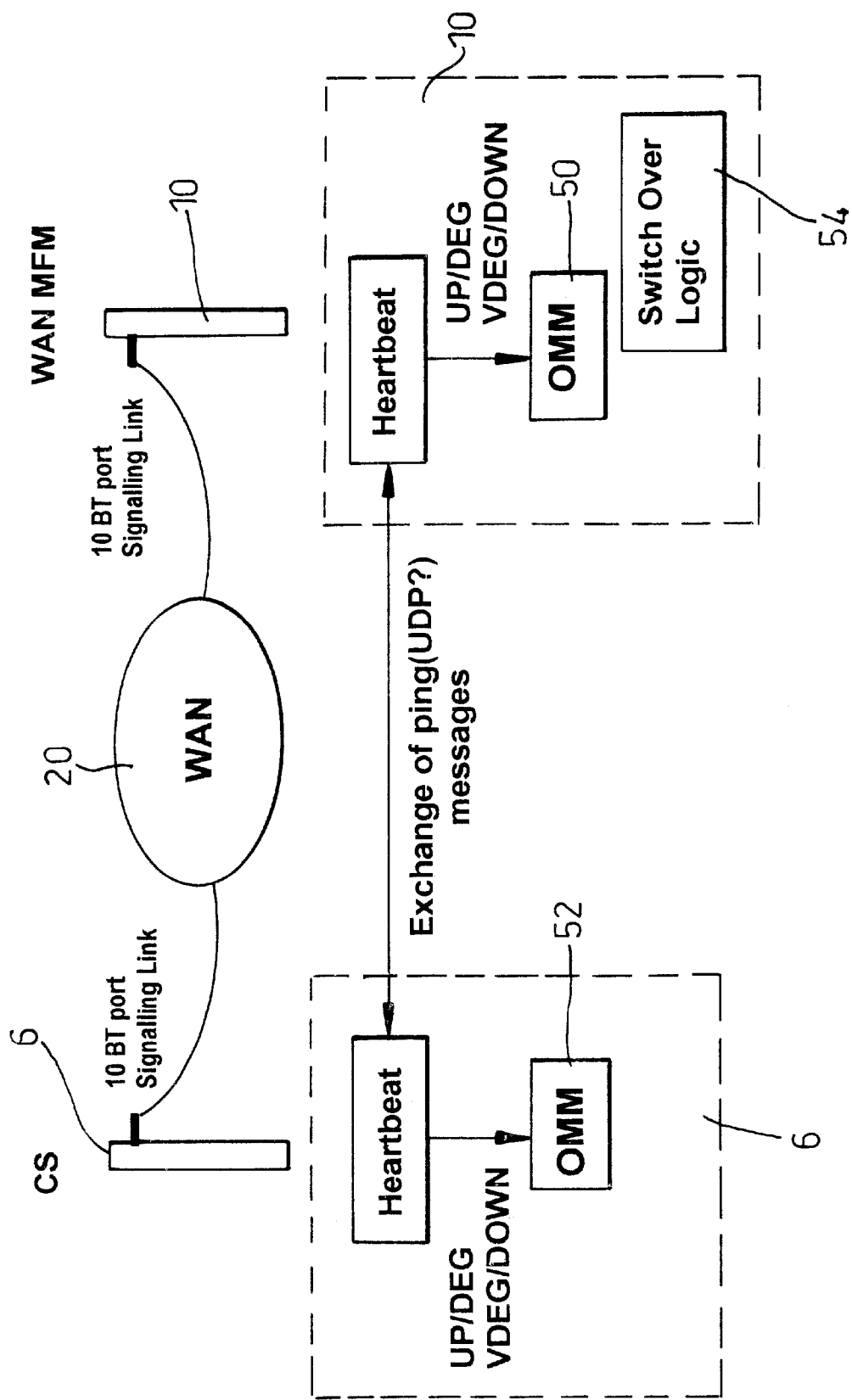
FIG. 6 is a schematic representation of a part of the network of FIG. 1 showing the method of continuous monitoring of a call server-access module connection via a WAN.

In accordance with the present invention it is preferred if each WAN AM 10, 11 has a means to monitor continuously whether or not an adequate communication link exists the CS 6. This may include monitoring the physical connection, e.g. power measurements, as well as monitoring logical integrity, e.g. that there is no interference on the WAN which causes an unacceptable packet or frame error rate. For example, a signal or message may be transmitted down the WAN 20 at regular intervals from CS 6. Each WAN AM 10, 11 may be polled in term. Each WAN AM 10, 11 receives the message and determines therefrom whether the connection with the CS 6 is operational. For instance, the error rate of a standard message may be determined. When this message is not received or when the error rate exceeds a certain level or more generally if the message does not meet all the Quality of Service (QoS) requirements, e.g. if the message is received but the delay is excessive, the connection to the CS 6 is assumed to be in non-operational and the access module may switch to survival mode. As shown schematically in FIG. 6, the CS 6 and each WAN AM 10 includes an Operating Manager (OMM) unit 50, 52. The OMM unit 50 of the WAN AM 10 is responsible for receiving the regular polling message ("heartbeat") from the CS 6 and for deciding if the connection with the CS 6 is operational. If the operation is down the OMM unit 50 informs the switch over logic unit 54 which is responsible for changing the operational mode of WAN AM 10 from normal to survival mode. Similarly, if the WAN AM 10 is in survival mode, the OMM unit 50 will detect when the CS 6 is again in contact and will control the change from survival to normal mode as described below in more detail.

The survival of locally established calls on an access module after connection failure to the call server will now be described for the first embodiment of the present invention with reference to FIGS. 7 to 11. In particular, how calls can be handled correctly after switch over and/or switch back process will be described.

As explained above an access module such as a WAN AM 10 in normal mode checks its connection with its Call Server 6 continuously. This check allows each access module 10 to detect the link down condition. When this "connection down" state is detected, the access module 10 switches over from the normal mode to survival mode. If required, a power unit local to the access module 10 is activated immediately when the connection to the call server 6 is down. All calls which are not local to the access module 10 are dropped. Upon switch over of an access module 10 from normal mode to survival mode, call clean up is performed on the call server 6 for that module.

The decision to switch from normal to survival mode is taken by the OMM unit 50 of the access module 10 based on the monitoring of the call server-access module connection. The OMM unit 50 informs the switch over logic unit 54 which then carries out the switch over as described in the following. A network memory database (call processing database which is to be distinguished from the configuration database) is stored on the call server 6 and on each access module 10 in which all call status information is normally kept. The call server 6 continuously up-dates the database on each access module 10 with the data relevant to calls on that module 10 so that all relevant data of established calls is already loaded into the network memory of each access module 10 before switch over takes place. This is called synchronization. The master data base is always kept on the call server 6. All established calls local to any access module 10 which were established as this module 10 was in normal mode remain physically connected during the switch over process to survival mode. Initially, this is achieved by providing a local power source in the access module which maintains the operation of multiplexers, buffers and switches so that the physical layer of the local PCM/TDM transmissions is maintained. Hence, all local calls are maintained. In addition, the software resources required to make the access module 10 able to handle these established calls is rebuilt on the access module 10 during the switch over so that these resources are configured for stand-alone call processing. This re-build is carried out by using information concerning the existing physical connections which is stored in the network memory of the access module. At the end of the switch over phase, the access module 10 handles all rebuilt (local) calls (previously established when it was in normal mode) as well as any new local calls which are initiated after it switches into survival mode.

Figure 7:
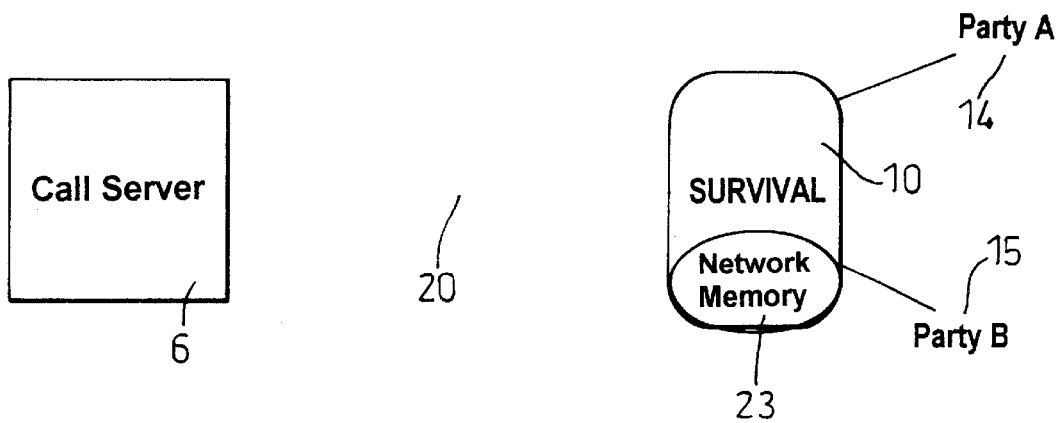
FIGS. 7 to 12 show schematic representations of message flows to transfer call processing control from a call server to an access module in accordance with an embodiment of the present invention.
Figure 8:
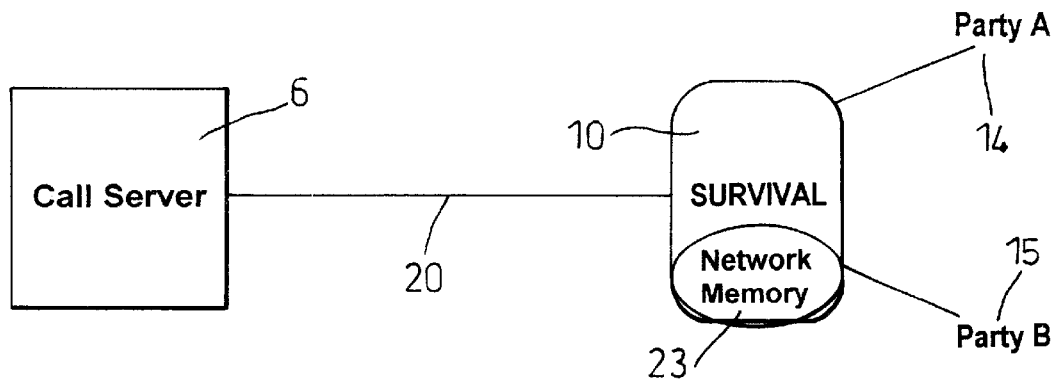
Figure 9:
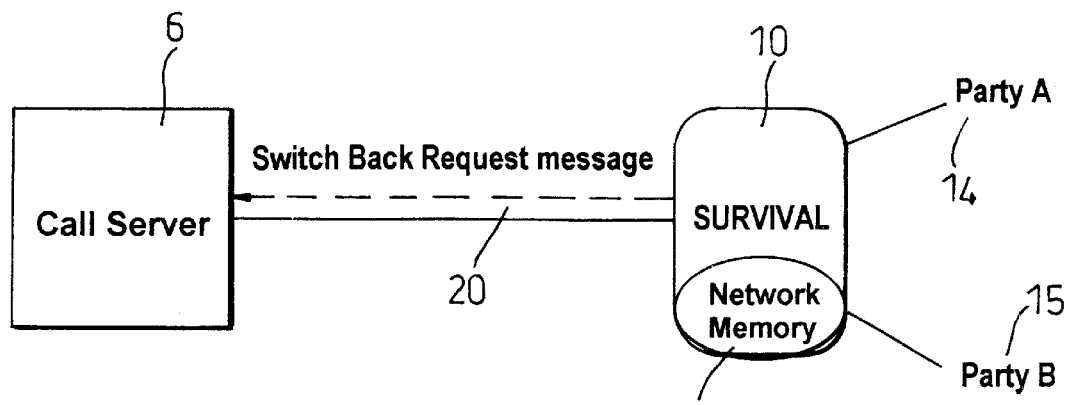

In whichever mode an access module 10 operates, the check on its connection with the call server 6 is carried out continuously. Let us assume that the link via WAN 20 between the call server 6 and the AM 10 is down (FIG. 7). In this case AM 10 is in survival mode and supports an existing telephone communication between two sets 14, 15. When an access module 10 in survival mode detects that the link is operational again with the call server 6 (FIG. 8, because of it's failure recovery, for example), it remains in survival mode and sends a message via the WAN 20 to inform the call server 6 about its availability to switch back into normal mode (FIG. 9). This message is a Switch Back Request Message. Because rebuild of calls takes some time on the call server 6, it is important that the final decision to switch back any access module to normal mode should lie with the call server 6 as this avoids or reduces errors or congestion when rebuilding a lot of access modules 10 at the same time.

Figure 10:
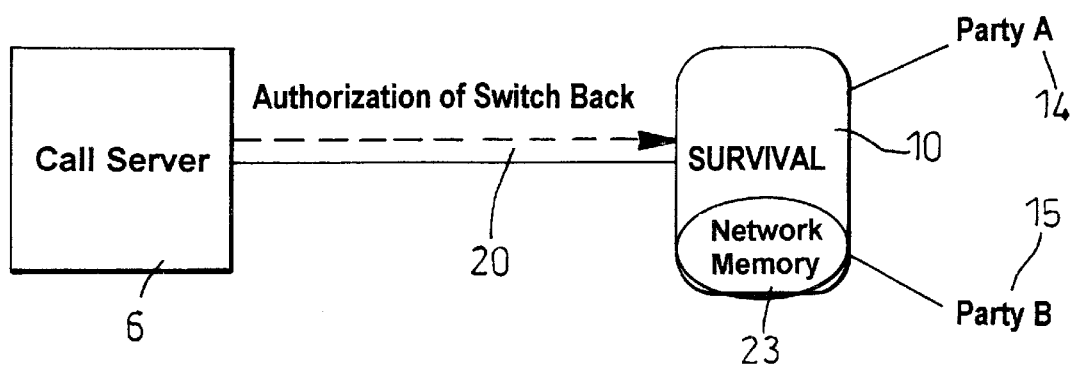

The call server 6 receives and stores chronologically all Switch Back Request messages and handles them one by one. At reception of such a request message, the call server 6 checks if it is not in the rebuilding phase for an other module. If the call server 6 is available, a message is sent to the relevant module 10 to allow it to process its switch back. The call server 6 sends a message of Authorization of Switching back to the first module 10 which has requested switch over (FIG. 10). When it has finished rebuilding all calls for the handled module, and only at this moment, the next "Switch Back Request message" from another access module is processed by the call server 6. Then the call server 6 sends an "Authorization of Switch Back" to the next module which has requested for it. With this synchronization, the call server 6 handles the rebuilding of one access module after the other in an orderly manner. The call server 6 may include a decision circuit to decide when an individual access module 10 should be instructed to switch back.

Figure 11:
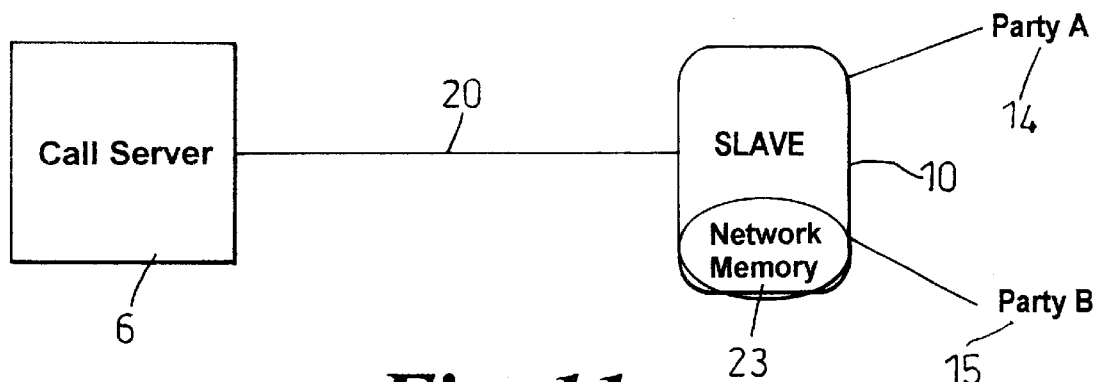
Figure 12:
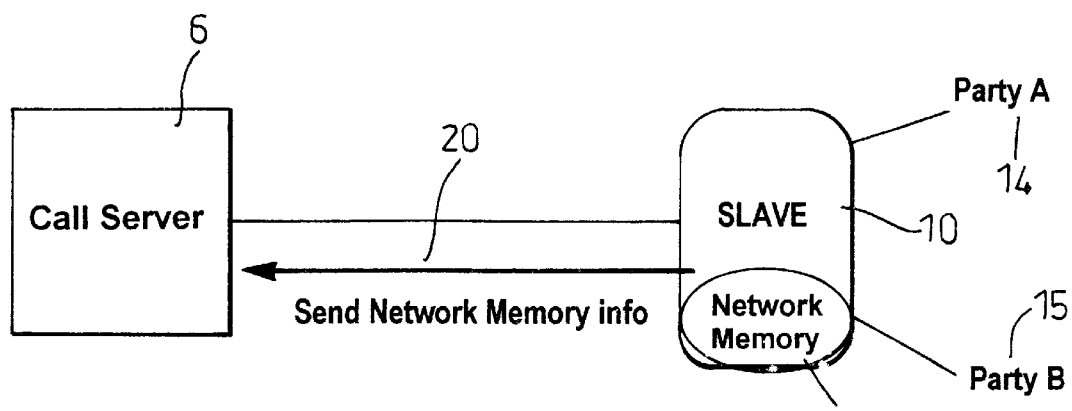

When an access module 10 receives the authorization of switching back from the call server 6, it switches into normal mode (FIG. 11). During this phase of switching, all locally established connections at the access module 10 are physically maintained and the network memory 23 in the access module 10 is not cleared. When an access module 10 is re-started in normal mode, the content of the network memory 23 (i.e. the call processing database) is sent to the call server 6 via WAN 20 (FIG. 12) where it is stored in the call server network memory 25. It is important that call processing database synchronization in the direction from the call server 6 to the access module 10 is immobilized for this access module 10 until the up-to-date call processing database in the network memory 23 of the access module 10 has been transmitted successfully to the call server 6 (otherwise the database in the access module would be overwritten with the old data from the call server 6). The call server 6 rebuilds all its software resources corresponding to all established calls on the relevant module 10 using the content of network memory 23 received from this access module 10. When the call server 6 has finished rebuilding local calls for one module 10 which has switched into normal mode, it checks if other "Switch Back Request messages" are waiting for processing and proceeds with the next one (if it is needed). During re-building activities there may be suppression of any new calls being accepted by access module 10 to avoid a change in the call processing database at access module 10 after the content of its network memory has been transmitted to the call server 6.

In the following a second embodiment of the present invention will be described with reference to FIGS. 13 to 17 in which two call servers are used, one active call server 6 and one hot-standby call server 60. All call servers 6, 60 and all access modules 10, 11 of this system preferably have the same configuration database in their respective memories. At start up, all access modules 10, 11 try to connect to the Call Server 6. After a defined time (timer expiration), an access module 10 which does not receive an "accept connection" from the Call Server 6, tries to register itself to the Call Server 60. After a further time-out without acceptance, it goes into Survival mode.

Figure 13:
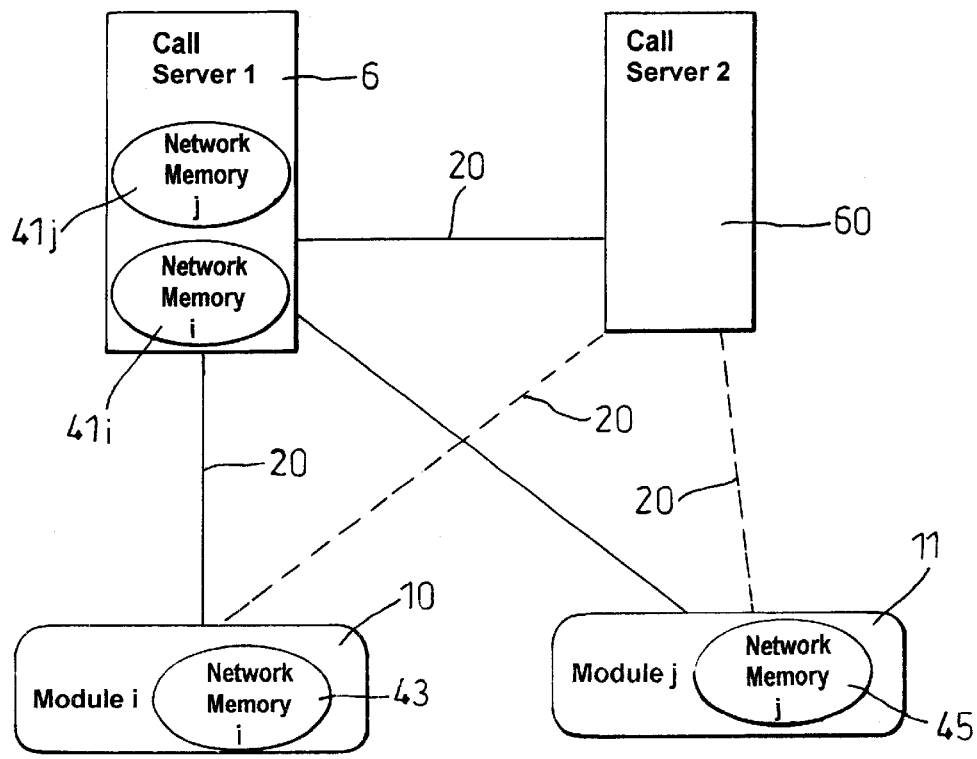
FIGS. 13 to 18 show schematic representations of message flows to transfer call processing control from a first call server to a second call server in accordance with an embodiment of the present invention.
Figure 14:
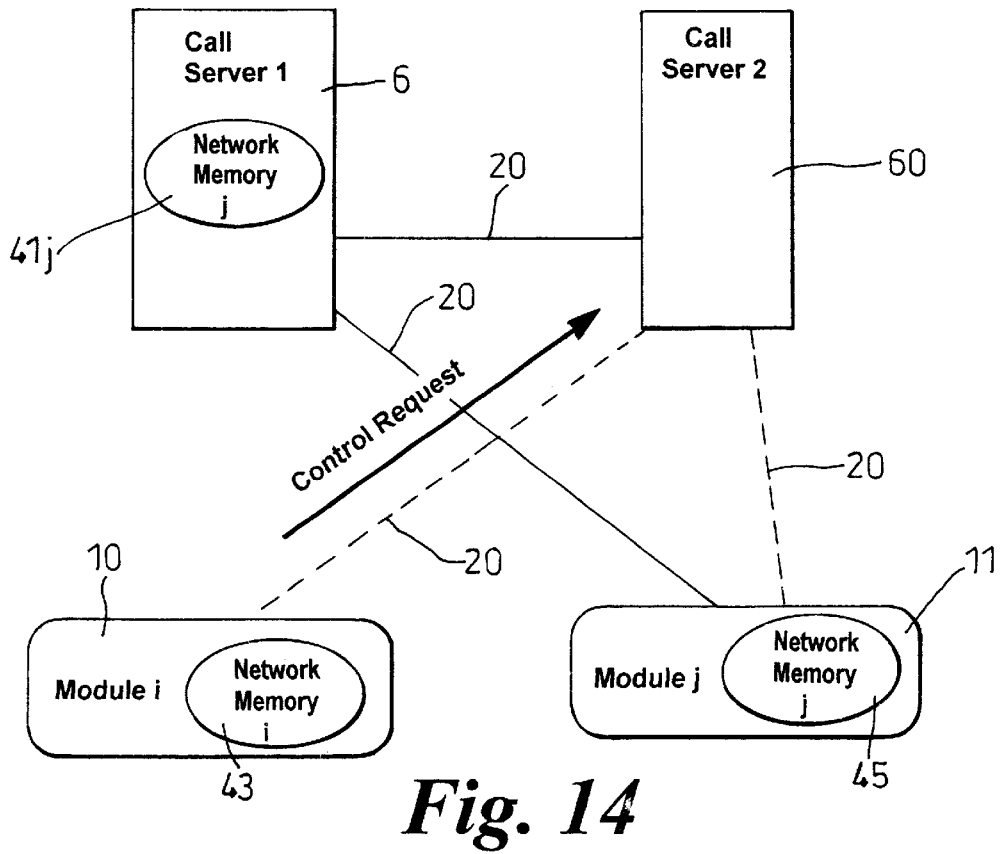
Figure 15:
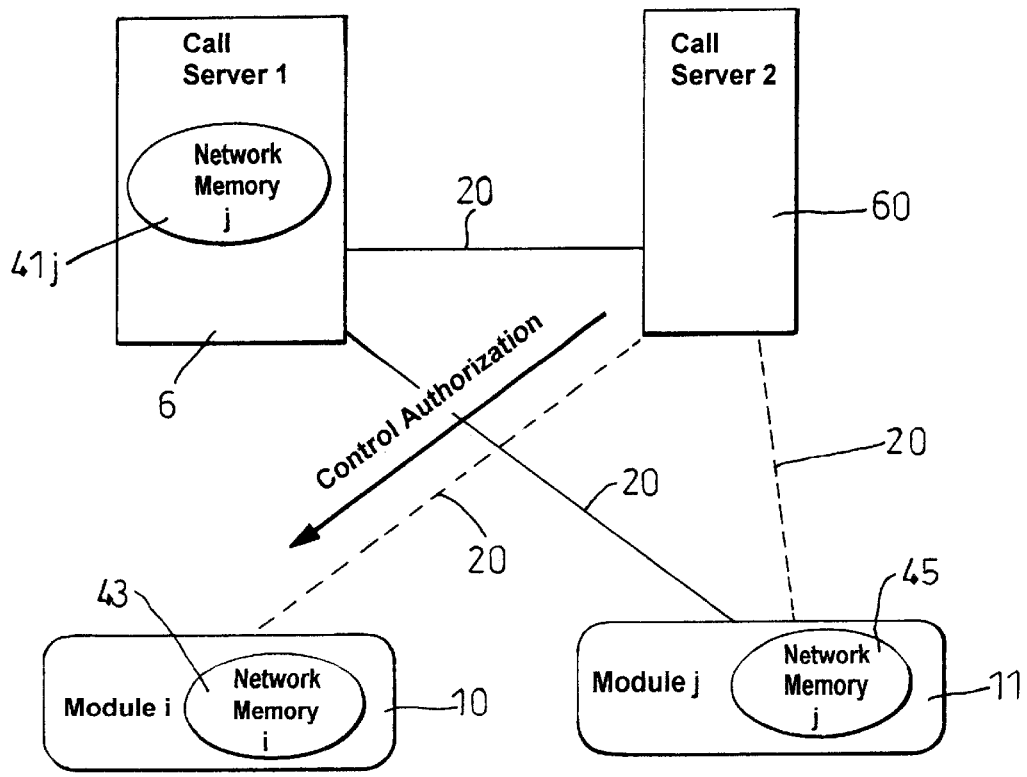
Figure 16:
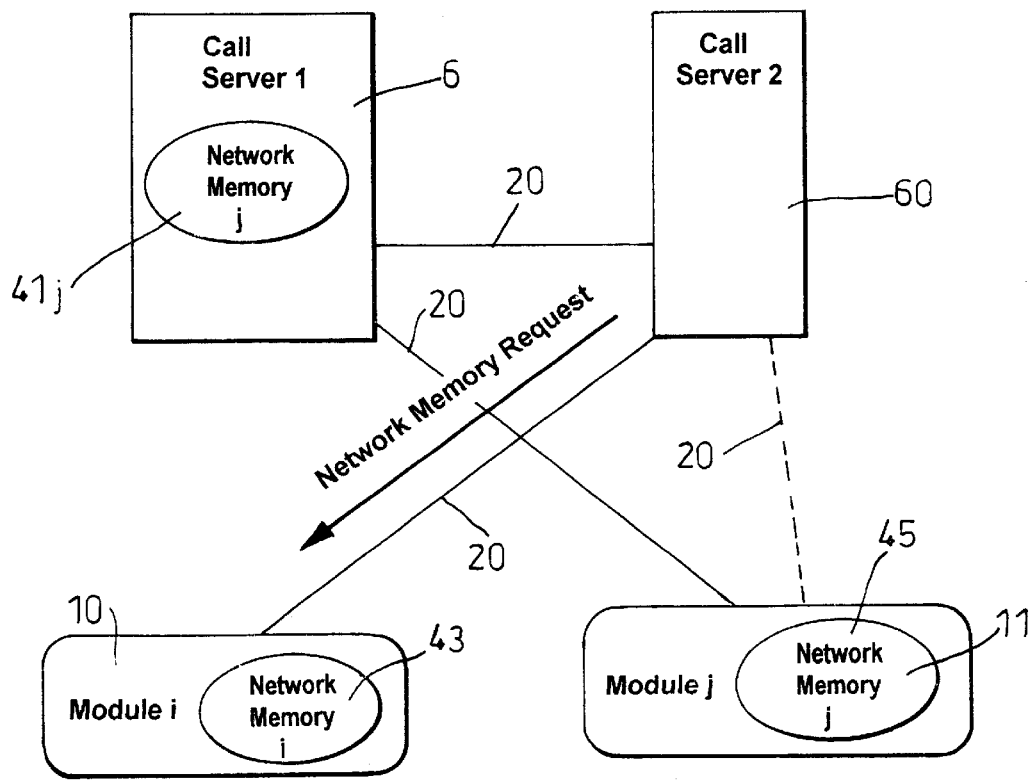
Figure 17:
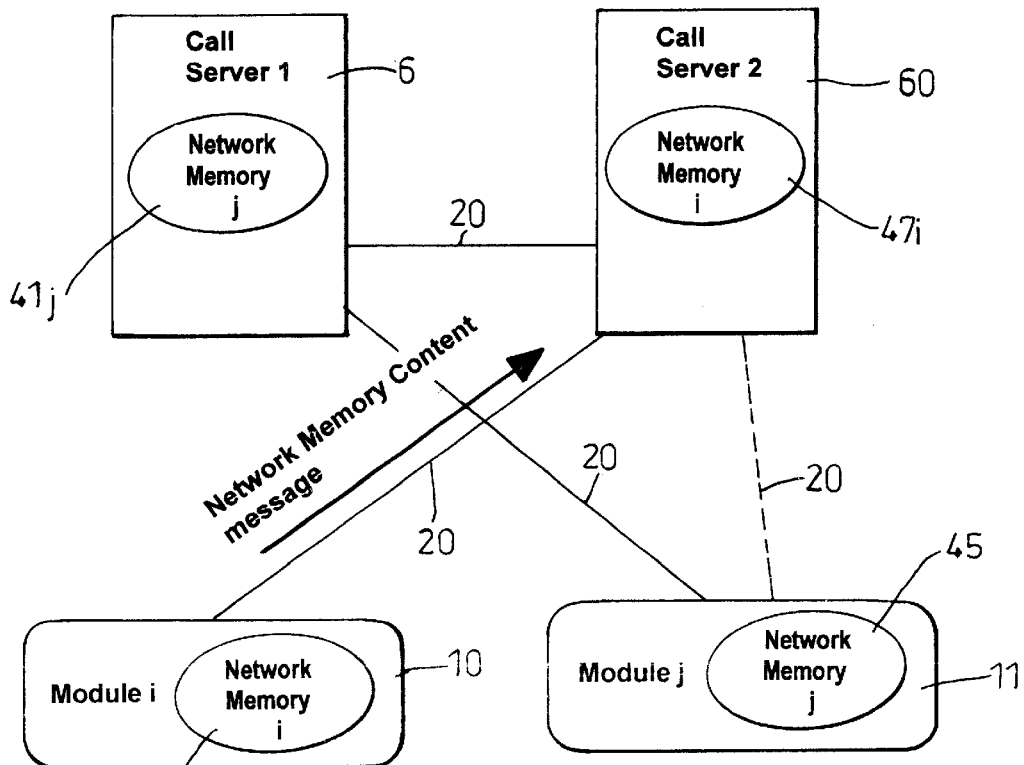
Figure 18:
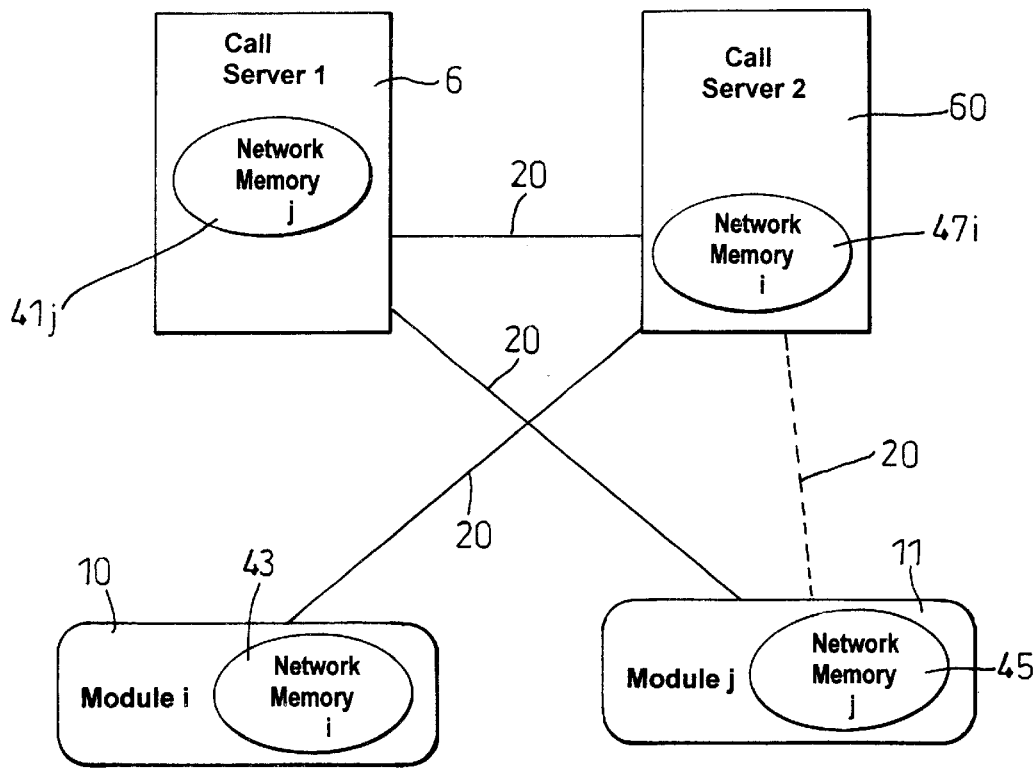

In accordance with this embodiment locally established calls are maintained when an access module is no longer controlled by one call server and switches to the control of the other call server. Let us assume that Call Server 6 controls the Call processing of the module i (10) and the module j (11) (FIG. 13). The network memory 41i and 41j on the Call Server 6 contains the image of physical connections on modules i (10) and module j (11), i.e. it contains the information stored in Network Memory 43 on Module i (10) and in Network Memory 45 on Module j (11). The active link between the Call Server 6 and the module i (10) is detected as down. On the Call Server 6, a clean up is done on all resources used to handle the Call Processing on module i (10) and on content of the Network Memory 41*i* corresponding with calls on the access module i. The Call Server 6 continues to control all call processing of access module j (11). Module i (10) detects that its link with the call server 60 is Up but that its link to call sever 6 is Down. The OMM unit of access module 10 decides to request to be controlled by the call server 60 and sends a control request message (FIG. 14) to call server 60. A timer is armed for awaiting a "Control Authorization" message from the Call Server 60. If this message is not received before the expiration of the timer, the module i (10) switches over into Survival mode. Otherwise, as it is shown in the FIG. 15, the "Control Authorization" message is received from call server 60 before the time-out. Then, the link between the Call Server 60 and the module i (10) becomes an active link. At the reception of the "Control Authorization" message, a timer is armed on the module i (10) for awaiting the "Network Memory request" message from call server 60. If this message is not received before the timer expires, the module i (10) goes into Survival mode. Call Server 60 stores all "Control Request" messages chronologically to be able to handle the rebuilding of calls sequentially. If some access modules have requested Control from Call Server 60 before module i (10), it may take some time before module i receives the "Network Memory Request" message. Call Server 60 sends the "Network Memory Request" message to the module i when it is available to handle the rebuilding of local established calls of module i (FIG. 16). Module i sends its Network Memory content to the Call Server 60 to make it able to rebuild local established calls of module i, as shown in FIG. 17. Call server stores the data from module i in its network memory 47*i*. The Call Server 60 rebuilds the software resource corresponding with all calls physically established on the Module i and assumes control of them (FIG. 18).

A similar procedure is used if the call control is changed back to call server 6 from call server 60, that is the above description of the transfer from call server 6 to call server 60 is repeated while exchanging the numbers "6" and "60".

While the invention has been shown and described with reference to preferred embodiments, it will be understood by those skilled in the art that various changes or modifications in form and detail may be made without departing from the scope and spirit of this invention.

What is claimed is:

1. A telecommunications system comprising:
   a shared resources network;
   an access module connected to the shared resources network for allowing telephone access to the telecommunications system;
   at least two user terminals connected to the access module;
   a call server on the shared resources network for controlling call signaling for each telephone call handled by the access module;
   wherein the access module is adapted to maintain a call between the two user terminals on the access module, without access to a call server for call processing, if the connection to the call server is below a pre-determined quality of service.

2. The telecommunications system according to claim 1, wherein the access module comprises a connection monitor which is adapted to continuously monitor a quality of service of the connection to the call server.

3. The telecommunications system according to claim 1, wherein the access module is further adapted to assume control of call signaling for maintained calls.

4. The telecommunications system according to claim 1, further comprising a first call processing database accessible by the call server.

5. The telecommunications system according to claim 4, wherein the system is adapted to regularly update the access module with at least a part of the contents of the first call processing database which comprises data relating to active calls between terminals connected to the access module.

6. The telecommunications system according to claim 5, wherein the access module comprises a second call processing data base for storing the data transferred from the first call processing database.

7. The telecommunications system according to claim 3, wherein the access module is adapted to transfer call signaling control to the call server when the connection monitor of the access module determines that the connection between the access module and the call server is above a pre-determined quality of service.

8. The telecommunications system according to claim 7, wherein the access module is adapted to send a call signaling control transfer request to the call server.

9. The telecommunications system according to claim 8, wherein the call server comprises a decision circuit which determines at what time the call signaling control is transferred from the requesting access module to the call server.

10. A method of operating a telecommunications system having a shared resources network, an access module connected to the shared resources network for allowing telephone access to the telecommunications system; at least two user terminals connected to the access module; and a call server on the shared resources; the method comprising the steps of:
    using the call server to control call signaling for each telephone call handled by the access module in a first mode;
    establishing a call between the two user terminals connected to the access module; and
    when the connection between the access module and the call server drops below a pre-determined quality of service:
    maintaining the call between the two user terminals connected to the access module without access to a call server for call processing; and transferring control of call signaling to the access module from the call server for the call between the two user terminals.

11. The method according to claim 10, further comprising the step of the access module continuously monitors a quality of service of the connection to the call server.

12. The method according to claim 10, further comprising the step of transferring the control of call signaling for maintained calls from the call server to the access module.

13. The method according to claim 10, further comprising a first call processing database accessible by the call server, and further comprising the step of regularly updating the access module with at least a part of the contents of the first call processing database which comprises data relating to active calls between terminals connected to the access module.

14. The method according to claim 13, further comprising the step of storing the data transferred from the first call processing database in a second call processing data base on the access module.

15. The method according to claim 12, further comprising the step of transferring call signaling control from the access module to the call server when the connection between the access module and the call server is above a pre-determined quality of service.

16. The method according to claim 15, further comprising the step of sending a call signaling control transfer request to the call server from the access module.

17. The method according to claim 16, further comprising the step of the call server sender a confirmation that the call signaling control is to be transferred from the requesting access module to the call server.

18. An access module for a telecommunications system having a shared resources network and a call server in which the call server handles all the call signaling; the module comprising:
   a monitoring unit for monitoring a quality of service parameter of a connection between the access module and the call server on the shared resources network,
   a management unit for deciding when the quality of service of the connection drops below a pre-determined level; and
   a switch over unit adapted for switching over the control of call signaling to the access module when the management unit decides that the connection with the call server is below the pre-determined quality of service, a processor arranged to support local calls without access to a call server in the case that control of call signaling is switched over to the access module.

19. The access module according to claim 18, further comprising a connection monitor which is adapted to continuously monitor a quality of service of the connection to the call server.

20. The access module according to claim 18, further comprising call processing database.

21. The access module according to claim 19, wherein the access module is adapted to transfer call signaling control to the call server when the connection monitor of the access module determines that the connection between the access module and the call server is above a pre-determined quality of service.

22. A telecommunications system comprising:
   a shared resources network;
   a plurality of network elements connected to the shared resources network, the network elements comprising at least an access module for allowing telephone access to the telecommunications system and a call server for controlling call signaling for each telephone call handled by the access module;
   at least two user terminals connected to the access module;
   wherein the access module is configured to maintain a call between the two user terminals on the access module without access to a call server for call processing and when call signaling control is transferred from the call server to another network element.

23. The network according to claim 22, wherein the another network element is a further call server.

24. The network according to claim 22, wherein the another network element is the access module.

25. The network according to claim 22, wherein the access module comprises a connection monitor which is adapted to continuously monitor a quality of service of the connection to the call server.

26. The network according to claim 24, wherein the access module is further adapted to assume control of call signaling for maintained calls.

27. The network according to claim 24, further comprising a first call processing database accessible by the call server.

28. The network according to claim 27, wherein the network is adapted to regularly update the access module with at least a part of the contents of the first call processing database which comprises data relating to active calls between terminals connected to the relevant access module.

29. The network according to claim 28, wherein the access module comprises a second call processing data base for storing the data transferred from the first call processing database.

30. The network according to claim 24, wherein the access module is adapted to transfer call signaling control to the call server when the connection monitor of the access module determines that the connection between the access module and the call server is above a pre-determined quality of service.

31. The network according to claim 30, wherein the access module is adapted to send a call signaling control transfer request to the call server.

32. The network according to claim 31, wherein the call server comprises a decision circuit which determines at what time the call signaling control is transferred from the requesting access module to the call server.

33. A method of operating a telecommunications system with a shared resources network and a plurality of network elements connected to the shared resources network, the network elements comprising at least an access module for allowing telephone access to the telecommunications system and a call server for controlling call signaling for each telephone call handled by the access module;
   establishing a call between at least two user terminals connected to the access module; maintaining the call between the two user terminals on the access module without access to a call server for call processing and when call signaling control is transferred from the call server to another network element.

34. An access module for a telecommunications system having a shared resources network and a call server as a network element; the module comprising: a monitoring unit for monitoring a quality of service parameter of a connection between the access module and the call server on the shared resources network, a management unit for deciding when the quality of service of the connection rises above a predetermined level; and
   a switch over unit adapted for switching over the control of call signaling to the call server when the management unit decides that the connection with the call server is above the pre-determined quality of service.

35. A telecommunications system comprising: a shared resources network; an access module connected to the shared resources network for allowing telephone access to the telecommunications system; at least two user terminals connected to the access module;
   a call server on the shared resources network; wherein the access module is adapted to set up and maintain a call between the two user terminals on the access module if the connection to the call server is below a predetermined quality of service and for transferring call signaling control for each telephone call handled by the access module to the call server if connection to the call server is above a pre-determined quality of service.

36. A method of operating a telecommunications system having a shared resources network, an access module connected to the shared resources network for allowing telephone access to the telecommunications system; at least two user terminals connected to the access module; and a call server on the shared resources; the method comprising the steps of:

using the access module to control call signaling for each telephone call handled by the access module in a first mode; establishing a call between the two user terminals connected to the access module; and when the connection between the access module and the call server rises above a pre-determined quality of service: maintaining the call between the two user terminals connected to the access module; and transferring control of call signaling to the call server from the access module for the call between the two user terminals.

37. A telecommunications system comprising:

a shared resources network;

an access module connected to the shared resources network for allowing telephone access to the telecommunications system;

at least two user terminals connected to the access module;

a call server on the shared resources network for controlling call signaling for each telephone call handled by the access module;

wherein the access module is adapted to maintain a call between the two user terminals on the access module if the connection to the call server is below a pre-determined quality of service;

said telecommunications system further comprising a first call processing database accessible by the call server;

wherein the system is adapted to regularly update the access module with at least part of the contents of the first call processing database which comprises data relating to active calls between terminals connected to the access module; and wherein the access module comprises a second call processing database for storing the data transferred from the first call processing database.

38. A method of operating a telecommunications system having a shared resources network, an access module connected to the shared resources network for allowing telephone access to the telecommunications system; at least two user terminals connected to the access module; and a call server on the shared resources; the method comprising the steps of:

using the call server to control call signaling for each telephone call handled by the access module in a first mode;

establishing a call between the two user terminals connected to the access module; and when the connection between the access module and the call server drops below a pre-determined quality of service:

maintaining the call between the two user terminals connected to the access module; and transferring control of call signaling to the access module from the call server for the call between the two user terminals;

further comprising a first call processing database accessible by the call server, and further comprising the step of regularly updating the access module with at least part of the contents of the first call processing database which comprises data relating to active calls between terminals connected to the access module; and further comprising the step of storing the data transferred from the first call processing database in a second call processing database on the access module.

* * * * *